(12) United States Patent
Corrado et al.

(10) Patent No.: US 7,982,601 B2
(45) Date of Patent: Jul. 19, 2011

(54) MULTI-MODAL ACTIVE RFID TAG WITH BIOMETRIC SENSORS, SYSTEMS AND METHODS OF ITV TRACKING

(75) Inventors: Anthony P. Corrado, Elbert, CO (US); Rex T. Logan, Superior, CO (US)

(73) Assignee: Innovation Law Group, Ltd., Sequim, WA (US)

( * ) Notice: Subject to any disclaimer, the term of this patent is extended or adjusted under 35 U.S.C. 154(b) by 625 days.

(21) Appl. No.: 11/938,477

(22) Filed: Nov. 12, 2007

(65) Prior Publication Data

US 2008/0061967 A1    Mar. 13, 2008

Related U.S. Application Data

(63) Continuation-in-part of application No. 11/082,327, filed on Mar. 17, 2005, now Pat. No. 7,295,108.

(60) Provisional application No. 60/555,153, filed on Mar. 22, 2004.

(51) Int. Cl.
*G08B 1/08* (2006.01)

(52) U.S. Cl. .............. 340/539.22; 340/5.92; 340/10.1; 340/10.51; 340/572.1

(58) Field of Classification Search ............... 340/572.1, 340/572.4, 573.1, 505, 10.1, 5.82, 5.83, 5.92, 340/539.22, 539.26; 235/385; 705/28
See application file for complete search history.

(56) References Cited

U.S. PATENT DOCUMENTS

| | | | |
|---|---|---|---|
| 5,640,144 | A | 6/1997 | Russo |
| 5,742,914 | A | 4/1998 | Hagenbuch |
| 5,774,876 | A | 6/1998 | Woolley et al. |
| 6,104,295 | A | 8/2000 | Gaisser et al. |
| 6,154,139 | A | 11/2000 | Heller |
| 6,211,790 | B1 | 4/2001 | Radomsky et al. |
| 6,493,649 | B1 | 12/2002 | Jones et al. |
| 6,614,721 | B2 | 9/2003 | Bokhour |
| 6,765,484 | B2 | 7/2004 | Eagleson et al. |
| 6,838,992 | B2 | 1/2005 | Tenarvitz |
| 2003/0227386 | A1 | 12/2003 | Pulkkinen et al. |
| 2005/0040241 | A1 | 2/2005 | Raskar |
| 2006/0065489 | A1 | 3/2006 | Oh et al. |

*Primary Examiner* — Thomas J Mullen
(74) *Attorney, Agent, or Firm* — Jacques M. Dulin, Esq.; Innovation Law Group, Ltd.

(57) ABSTRACT

RFID tags, methods and systems for total asset management, in-transit visibility and bio-metric verification and authorization. The system comprises an active, multi-modal, bi-directional RFID tag having a primary communication mode RF transceiver and a secondary mode IR/US transceiver. The tag includes sensors, such as bio-metric, and memory containing user bio-metric data. A reader and illuminator(s), preferably IR and/or US, are communicatively coupled with the tag and adapted to provide command and control signals to the tag and receive data/information from it. The user's bio-metric data is read by the sensor, compared to the data base and verification communicated to an access or point of sale device. The tag looks for illuminators and reports to the reader the IDs of those it sees. The detection history permits tracking and locating tagged objects or persons, such as theme park guests. If no illuminator signal is seen, the tag sends a special signal.

17 Claims, 10 Drawing Sheets

MULTI-MODAL ACTIVE RFID TAG WITH BIOMETRIC SENSORS, SYSTEMS AND METHODS OF ITV TRACKING

CROSS REFERENCE TO RELATED APPLICATIONS

This application is a continuation in part of parent U.S. Ser. No. 11/082,237, filed Mar. 17, 2005 by the same inventor, titled "Active RFID Tag Utilizing a Secondary Communication Mode", now U.S. Pat. No. 7,295,108, Issued Nov. 13, 2007, which in turn is based on priority Provisional Application 60/555,153, filed Mar. 22, 2004 by the same inventor under the same title, the benefits of the filing dates of which are claimed under 35 US Code §§119 and 120ff, and the disclosures of which are incorporated herein by reference.

FIELD OF THE INVENTION

The invention relates to the field of active multi-modal Radio Frequency Identification (RFID) tags and systems, and more particularly to bi-modal and tri-modal tags, systems of illuminators, readers and tags, and methods of In Transit Visibility (ITV) and Total Asset Management (TAM), including use of biometric sensors on or as part of the system in association with the tags More particularly, the invention relates to RFID tags that are bimodal, that is, tags that utilize a combination of Radio Frequency (RF) signals and localized secondary communication modes, principally Infra Red (IR) and ultrasound (US) communication and sensing.

BACKGROUND

Radio Frequency Identification (RFID) applications are proliferating as the benefits and economics of automated tracking and identification are being realized by the global community. RFID is the ability to detect, read, and/or write data to and from tags that are affixed to "things." The cost of the RFID tag is an important consideration underlying adoption of this technology.

There are several categories of RFID tags and readers in use. The predominant technology currently uses passive tags. Passive means that the tags have no battery. They derive power from a reader that transmits electromagnetic energy to the tag, which in turn reflects or modulates the energy signal back to the reader. While passive tags and readers are relatively inexpensive, they have severe limitations dictated by physics. For example, passive tags and readers have a limited range (from 0.1 cm to 6 meters) and are non-operational when blocked or shielded by metal objects, liquids and certain solid materials. In such systems, data rates are limited such that a moving object having a tag affixed to it which needs to be read may not travel in excess of approximately 6 mph "drive-thru" speeds thru portals, conveyors, etc, that is, no more than a brisk walk. Further, passive systems have limited data storage capacity and no sensing capability.

There are also "active" tags that derive their power from incorporated batteries. Such devices add significant value to the process of inventory tracking and In Transit Visibility (ITV) enabling processes such as Total Asset Visibility (TAV). Relative to passive tags, active tags have a greater data acquisition range (0 to 1000 meters). Active tags have the ability to provide Real Time Location System (RTLS) effectively, to automatically provide theft deterrence thru continuous and automatic "presence detecting," and to enable tracking through processes such as manufacturing, shipping, on trucks, forklift transfer, and warehousing. A disadvantage of active tags is that they cost more than passive tags and this requires that these tags must achieve maximum performance, add value to supply chain management, have useful battery life and permit easy replacement or recharging of batteries, while achieving these goals at absolute lowest cost.

Many active tags simply "beacon" or periodically transmit data, such as tag ID data, ranging from several times per second to once every few minutes. This amounts to a "check-in" function, wherein the tag is letting the reader know "here I am", and implicitly, the object to which the tag is attached is also within reader range. However, this approach has limitations. In many instances, the continuous battery consumption is prohibitive, since RF data transfer is really only required at change of events, that is, for example, when handling or processing the tagged items. In addition, it is often desired to associate a specific tagged item with a process such that the tagged item can be associated with a specific event, time or operator and beacon tags do not provide this utility. It is often desired to locate a specific tagged item in a situation where many identical items are tagged. It may be desired to be able to change the tag's mode of operation, i.e. turn the beacon mode "OFF" or "ON", or change the beaconing rate. A specific tag should be able to respond under any of these circumstances. The ability to transfer data from the tag via a medium other than RF signals is also a desirable functionality since many locales and operations (such as aircraft flight) require RF silence.

Therefore, current commercial tags offer secondary triggering or communication modes of operation. "Triggering" is the remotely transmitted command to a tag directing that it execute a function such as "transmit RF, store data, or take a sensor reading". These secondary modes are restricted to the use of magnetic or RF fields to effect the triggering or communication. RF and magnetic triggered tags have the problem of being non-discriminatory. That is, "singulation", single tag actuation from amongst many, is not possible, by which is meant that picking one item out of many by trying to communicate with that object's tag by RF is not practicable. This is due to the nature of RF fields; they cannot be restrained to a narrow effective Field of View (FOV) and hence are not tag-specific in the presence of many tags. They are also costly.

Low frequencies (of the electro-magnetic domain) such as 125-134 KHz require very close proximity to actuate the tag response and often will not work at all, well or consistently, where the tag is attached to ferrous objects. Higher frequencies such as 915 MHz also are affected by metal items. Higher frequencies are often reflected, creating a background of RF noise that makes single tag actuation less reliable than is required. Similarly, IR noise such as generated by light, TV appliances (particularly LCD and plasma TVs), and heat sources significantly affect IR tags. All of these triggering mechanisms are large, bulky, and expensive. Handheld triggers or communicators are also large and bulky. Many applications require that the tags and readers comply with Intrinsic Safety requirements. This task is significantly complicated and more costly with low frequency devices due to the necessity for relatively high source power. Additionally, the transfer of data is at relatively low speeds.

Accordingly, there is an unmet need in the art for low cost, active RFID tags that provide accurate, reliable, consistent data transfer, including transfer of sensor data in electromagnetically noisy environments to permit a wide variety of application for tracking of goods and people, for access control, and for security of use of goods and financial transactions, to name a few.

THE INVENTION

Summary, Including Objects and Advantages

In accordance with the present invention, the above and other problems are solved by the inventive low cost active Radio Frequency Identification (RFID) tag system that has multi-modal and bidirectional (transceiver) communication capability, and can accept a wide range of sensor inputs, including but not limited to: temperature, humidity, chemical, contact, vibration, photo and biometric sensors. The multi-modal communication channels of the inventive tags are implemented, by way of example, as bimodal or tri-modal tags having a first Radio Frequency (RF) mode for bidirectional communication of signals, coupled with an optical and/or ultrasonic secondary mode of bidirectional signal communication and/or triggering. Bidirectional communication is implemented, for example, by use of transceivers.

This combination of dual-mode or multi-mode communications allows long range and autonomous tracking of objects to be realized through the RF transmit mode, while providing local communication (transfer) of data simultaneously through the secondary mode of communication. The ability to communicate through optical or ultrasonic secondary mode means that radio silence can be maintained (such as when on aircraft), while the total tag functionality of data transfer can be accomplished through the secondary mode. It also means that a tag can be triggered to transmit the RF signal on a discriminatory basis.

In addition, the two (or three, or multi-) modes are linked internally in the tag. That is, the tag internal microprocessor is programmed or configured to read or use one mode signal to trigger the tag to broadcast, send or receive a signal in one of the other modes. Thus, an JR trigger (also called an "illuminator") may broadcast an IR signal locally, for example, within a room or area that is pre-selected or limited by the IR trigger power range, to any one or more tags in the room, and when one or more selected tags in the Field of View (FOV) of the illuminator "sees" or receives the trigger signal from the illuminator, it/they respond(s) (or not) in a pre-selected, pre-programmed way to the IR signal by broadcasting an RF signal. Thus, the illuminator signal triggers, internally in the tag, the communication mode change.

Similarly, the tag may be pre-programmed to awaken periodically, and look for the local IR signal from the illuminator. The tag, upon seeing the JR signal, is programmed to go back to power-down or sleep mode. However, if the IR signal is not seen, the tag can be pre-programmed to send out an RF signal that it is no longer within the FOV of the IR illuminator. As a consequence, inventory management knows that the object on which the tag is secured has been moved, the tag or object destroyed, or the illuminator is malfunctioning, removed or OFF. In this embodiment, in operation, the tag is programmed to look for an IR illuminator with a pre-selected ID. It may be programmed so the presence or/and absence of the IR signal is linked to the RF transmitter or transceiver of the tag to send out an RF signal reporting the tag's presence every so often, say every 5 minutes. That means the object is in the room in which the ID'd illuminator is permanently located, i.e., where it is supposed to be. If the tag no longer sees the illuminator, or sees one with a different ID, it can be programmed to report via RF that the proper IR signal is lost, and optionally, what signal it sees, if any.

By way of example, where a hospital has a valuable piece of diagnostic or treatment equipment that is more or less portable, but is assigned to a particular location, e.g., room, in the hospital, an ID-coded JR illuminator is mounted in the room and powered by the normal power lines (wiring) of the building (hard wired or permanently plugged into a wall outlet). An inventive bimodal tag is secured to the equipment unit. The tag is pre-programmed to report periodically if it sees the correct ID, by linking the received JR signal from the illuminator to the tag's longer range RF transmitter. The tag is also programmed to report loss of that signal, so that, in relatively real time, if the equipment is moved to a non-authorized location (e.g., stolen), it reports by RF signal that it has lost the IR signal (e.g., been moved from the authorized location).

Optionally, the tag can be programmed to report seeing a different IR signal with a unique ID number. Thus, for example, if the tagged unit reports that the IR signal is from an illuminator on the loading dock, the administrative or security responders will not only know that the object is not where it is supposed to be, but also exactly where it is. Indeed, by this method, the unit can report its location as it passes from room to room. By using two horizontally spaced-apart IR illuminators, one in each room next to the door (portal), the direction of movement can also be detected by comparing the time sequence of acquisition by the tag of the respective illuminators. If illuminator A is seen before B, then the object is moving from A to B. If B is seen first, then the object is moving from B toward A. Thus, an asset management system can automatically determine that a tagged asset is entering or leaving a particular controlled portal area. That is an example of the In Transit Visibility aspect of the Total Asset Management system enabled by the inventive system.

In its system aspects, the invention comprises the multi-modal tags, at least one device having illuminator or/and reader functionalities, preferably bi-directional. The reader is a receiver that is capable of receiving the tag signals, whether they are IR, RF, US or other mode. In addition, the illuminator may also include a receiver or have a receiver section therein. Usually, the reader is an RF transceiver that is not located in the same room as the illuminator, but may be. Thus, the reader may be remote from the tag, but within the RF broadcast range of the tag. The system thus comprises at least two of the components, one of which is a tag, and the system preferably includes all three components or functionalities in at least two components. The system can be implemented in a handheld device, such as a PDA, that incorporates any or all of the functionalities described herein, including bi-directional IR/US, bi-directional RF, singulation, and both reader and illuminator functionality.

The IR illuminator is generally positioned locally with respect to the tag, generally defined as being within the FOV. It should also be understood that any combination of modes may be used. Thus the illuminator may be an Ultrasound device, and the tag programmed to receive the US signal and link that to one of the other modes for transmit out. By linking is meant causal connection; receipt of the IR signal causes the tag to send out one or more of RF, US or IR signals, or conversely receipt of an RF signal causes transmitting of an IR signal. Another way to consider linkage is that receipt of one mode signal causes the tag to switch communication to another mode. Tags themselves may be readers or illuminators with respect to other tags, power permitting. The signals transmitted to and from the tag may be ID signals, timing signals, coordination signals, sensor data signals, command signals, control signals, or combinations of such type signals, and any other type that provide utility to the inventive tags, system and their operation.

A key element in making use of the inventive multi-modal tags and systems is the ability to incorporate sensors or receive sensor input signals from "remote" sensors. This enables the tag to acquire additional data, or permit the addition of security features, or the like additional utility. In the inventive embodiment in which a bio-metric sensor provides input to the tag, security is significantly enhanced as the user of the tagged object. e.g., a credit card, computer, vehicle, key or keycard, etc., can be restricted to the individual for which a fingerprint feature set has been installed in (programmed into) the tag. A biometric sensor tag is of particular interest to industry, as such a tag will assist in preventing fraudulent use of a tag-bearing object, e.g., a credit card having a bio-metric sensor tag at a Point of Sale, or in cases where the tag is interrogated for other billing purposes, such as toll road use confirmation or HOV verification.

The point of sale use of such an invention is significantly enhanced by the communication modes between tag and Point of sale units. There are two communication modes of interest. First, if the mode is IR only, the security of the transaction is achieved by the power limits placed on the IR transmitting diodes. By limiting such power, the communication range is constrained from a few mm to several cms, thus ensuring that "spillover" does not occur such that interception of the signals is virtually impossible, as reflected infra-red energy is virtually non-existent. In the case where RF bi-directional communications are used, the signals are encrypted and therefore once again ensure secure communications.

Another aspect of the present invention relates to methods and systems for transferring data wirelessly that eliminates the requirement for a resonator or other accurate time reference to control the timing of the input or output data pulse train. Elimination of this control element permits the RFID tag to operate with its associated reader in the presence of temperature-induced variations in the control timing.

Embodiments of the invention may be implemented as a computer process, a computing system or as an article or related interactive group of articles of manufacture, such as a computer program product, computer readable media or multi-component system, such as tag, reader and illuminator. The computer program product may be a data storage medium readable by a computer system and encoding a computer program of instructions for executing a computer process. The computer program product may also be a propagated signal on a carrier readable by a computing system and encoding a computer program of instructions for executing a computer process.

The invention also provides a method to remotely authorize an RFID tag to permit the bio-metric ID, or "signature", to be changed remotely via either the RF, IR, US or combined mode(s) of communications. The utility of such remote authorizations applies to tags that are used to seal containers, entry control points and temporary authorizations enabling a purchase to be made by other than the person whose biometric signature was originally input into the tag.

The following is an exemplary description of an inventive bi-modal, bidirectional, RFID tag-enabled security system applicable to systems that need to control access. The system consists of an active, battery powered bio-metrically enabled tag mounted on a locked container, a pre-selected and pre-programmed signal from which tag enables the container to be opened for access (that is, unlocked). The tags contain a bi-directional RF transceiver which enables both data, and command and control signals, to be transmitted to the tag from remote distances. The tags also contain a bi-directional IR transceiver enabling localized data transfer as well as command and control to and from a handheld trigger/illuminator. The tags also incorporate, or receive sensor input from, a bio-metric sensor, such as, by way of non-limiting example, a fingerprint reader or retina scanner.

In operation, the person requiring access to the locked container, need only scan his finger-print over the bio-metric sensor. The scanned image is analyzed by the sensor microprocessor and the features derived therefrom are checked against the stored feature set. However, in the case where a different person requires access, their fingerprint features can be transmitted to the RFID tag remotely, thus enabling a unique, or un-planned person, to gain entry as their feature set becomes embedded in the RFID bio-metric enabled tag relational database.

In the case where the bio-metric sensor is used for a point of sale transaction, the same process as stated above for lock access applies to the completion of the sales transaction. In this case, the person offering the RFID bio-metric enabled credit card for payment at point of sale is required to put his or her finger on the sensor area or pad on the credit card for reading. If the data set of the "read" fingerprint match the pre-loaded authorized user fingerprint data set in the tagged card database, the tag transmits the appropriate authorization or verification code via short range RF to the reader at the check-out counter (point of sale tag or card interrogator or reader). If not, either no transmission is made, or a "mismatch" signal is broadcast. The database can either be in the tag or the card. The same remote authorization for another person can be effected for the sales transaction as was described for lock access.

For set-up or initialization of the tags, the tags are accessed through password protected encryption and their memory loaded with encrypted and stored data, including the biometric ID information of the authorized user, enabling access. Such data would include, but not be limited to, fingerprints, eye maps, passwords, encryption algorithms, etc. These data profiles are input through handheld tag program devices and the like. Using any of these methods an authorized person will have a biometrically personalized card or tag device that permits access to the RFID-"locked" device, location, process or transaction as needed.

Consider, as an illustrative example, a related group participating in a cruise or theme park environment. In such circumstances the principal person to whom use/access is to be provided is unknown at the time of registration, or the individual person of the group for whom authorization is to be granted is unknown until such time as the controlled access is to be granted. In the case of a locked shipping container, as an example, if a customs agent were going to open the container for inspection, he would not have access as the RFID tags would not recognize him as an authorized agent. However, the port security could transmit his particular biometric feature data set along with authorization status such as the frequency of access he would be permitted, and this data could be transmitted to the tag via direct RF or networked RF over significant distances.

As another example, cruise ship passengers would be authorized to spend money at various points of sale as set up upon initial registration. At registration, the fingerprint feature set identifying a guest would be input to the tag at the time of registration. The guest would register with a authorizing agent who would collect the money to be spent, obtain the fingerprint scan feature set, and then issue an RFID tag that could be used anywhere the venue provides. However, a guest could register a scanned feature set for all of the members of his party with the registration agent. That is, the memory of the tag can accept multiple fingerprint data sets, any one of which is authorized. By means of a relational data base, each print can have conditions attached: e.g., venues where that person is or is not permitted (children not allowed in casinos); time of day that access is permitted; or amount authorized to be spent. Thus, when the principal guest (e.g., parent or guardian) were to authorize a child to use the RFID tag for a purchase, the child's fingerprint feature set could be preloaded into the tag, or later transmitted to the tag via RF. The venue authorization as well as the number of purchases permitted could all be transmitted via the RF signals to the tag or reported to the principal guest via RF from the tag to the Purser of the cruise vessel.

A variant of this use of bio metric sensing and authorization is the incorporation of a bio-metric sensing unit that is incorporated as part of the point of sale (POS) infrastructure (part of a cash register for instance). In this mode of operation the bio-metric sensor is permanently used as part of the POS transaction. The purchaser would scan the bio-metric feature (fingerprint, retina scan, etc.) and the scanning unit would communicate with the user's RFID tag via either IR or RF and verify that the feature set obtained by the point of sale device matches the feature set stored on the tag itself. In this example, multiple users' feature sets could be stored on the tag (such as family multiple members) and the point of sale scanner would transmit and verify that the scanned feature set was a match with at least one of the pre-stored and pre-authorized signatures before the sales transaction would be permitted. The RFID tag would transmit the verification to the point of sale device via either infra-red or RF.

The tags may be mounted in any suitable way, for example, on credit cards, on wrist bands, on cards attached to neck or belt lanyards, on the object itself, and the like.

In still another example, the LEDs on the tags can be used to communicate signals to the tag user and to provide warnings. For instance, the lanyard or wrist-band tag LED can blink "red" when a user such as child is leaving a protected area, or when the user is being "searched for" by a parent or guardian. In these examples the warning to the child can be sent by a fixed portal IR illuminator programmed to transmit warnings or the message can be sent via RF anywhere in the venue that an RF infrastructure is installed.

These LED features can also be used to alert a user when a time period has elapsed. On of the biggest reasons for poor experience at theme parks is long in-line wait periods. This also inhibits many potential customers from even attempting to attend. The inventive tag having the LED lights permit the user to get in line, and upon passing an entry portal, be "registered" for that event, attraction or exhibit. The person can leave, go to some other activity, such as obtain food, go to a rest room, attend another exhibit, go shopping, etc. As the waiting period passes, a series of time code light displays can be sent by an illuminator wherever the guest may be at that moment telling them that a particular ride or a guest waiting period has expired, or will expire in a defined time, say 5 minutes, 10 minutes of the like. Thus, when the user's turn is within 10 minutes, a yellow LED flashes or is lit. When the count-down gets to 5 minutes a green LED lights, and when time has expired before the user shows up at the ride, the red LED lights. As soon as the user/guest is within the FOV of the ride loading area, the tag sees the ride illuminator, checks in with the reader, and the reader or illuminator commands the tag to turn off the LEDs.

In addition, the LEDs can be used as guidance, directional or warning devices. Since arrays of illuminators can be used in strategic locations, e.g., one or more in each room as needed to provide a full FOV for all tags within it, or spaced as described on entry and exit of portals, the motion of the guest with respect to the illuminators, and therefore their motion in and path through the venue, is reported by the inventive system. If the guest, in attempting to get back to the ride loading zone makes a wrong turn, it will be detected by the relative motion detection software of the system, and a red LED can flash, alerting the guest to turn around and go back. In essence, the guest follows a green lighted path back to where it is he/she wants to go.

Similarly, for children, an example is mounting the tag on a wrist-band. If the child wanders into a dangerous area, or leaves the venue, one or more red LEDs would flash, alerting the child to stop and retrace his/her steps. The guidance feature described above can redirect the child to safer place. In addition, the system can be programmed to track the child, and if the tag sees an illuminator that is mounted off-venue, e.g., outside, it will report automatically via an RF signal where the child is so that retrieval or rescue is efficiently and effectively directed to that area.

The incorporation of a temperature sensing device on the tag would also be capable of detecting environmental conditions, such as over-heating or potential hypothermia or freezing conditions, and warn both the user (thru the LED system) or the venue operators by transmitting such a warning thru the RF communication mode to alert authorities that a child or other user is in need of assistance. Children often shed clothes in the excitement of the moment, or when they are active in play. Then when they stop, they may get cold. Likewise, wind or weather changes quickly in many venues, so that such temperature change alerts enabled by the inventive system are of great use.

The above-described examples as relating to children also apply to elderly, emotionally or mentally handicapped persons, patients who may become disoriented, and pets. One skilled in the art will recognize a wide range of useful applications of the inventive system.

As another example, where the tags are secured to the insides of containers carrying biologicals, they can be programmed with minimum and maximum not-to-exceed temperature ranges. When programmed with a safety margin, the tags can signal when, e.g., required cooling or heating is near to being exceeded or is otherwise ineffective.

Contact sensors also integrate into the inventive system. Such sensors tell the tag when they are separated from the object to which they should remain attached, and an alert can be sent by RF to a remote reader. In addition to the ID of the tag and the illuminator or reader, the tag can also send via the RF mode, the serial number or other ID of the object to which it is attached. Indeed, the ID of the object can be the name of the guest, user or child. Tags with contact sensors can be secured to any valuable object, including but not limited to: museum artifacts, antiques, goods, equipment, and the like.

In regard to the tracking and guest inventory aspects described above as applications of the inventive system, large cruise ships may debark in excess of 2000 passengers at an interim stop, and the time ashore may be only on the order of a few hours. In addition, ships often must sail within defined periods, when the tides permit. Keeping track of which guests leave and whether any are left behind is time consuming, reducing time ashore, and difficult, at best. Accordingly, issuing wrist bands or lanyard tags permits automatic "inventory" of guests going ashore and returning, as their tags are triggered by an illuminator as they pass through a portal to leave the ship, and logged back in when they return. That gives an instant ID of who may be left behind. With a WAN system in place, on-shore establishments may also be in the network, so that positive location of the missing few is possible. In addition, the use of the LED time period notification or/and guidance system may be enabled for this class of users. This system is also useful for airline stop-overs, employee tracking, patients in hospitals, including new-borns, elderly, Alzheimer patients, and the like.

These and various other features as well as advantages, which characterize the present invention, will be apparent from a reading of the following detailed description and a review of the associated drawings.

BRIEF DESCRIPTION OF THE DRAWINGS

FIG. 10 is a diagram illustrating the in transit visibility and tracking operation of the system, whether applied to an object, a child, a guest, a patient or the like.

DETAILED DESCRIPTION OF THE BEST MODE OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

One aspect of the present invention relates to a low cost Radio Frequency Identification (RFID) tag having a Radio Frequency (RF) mode for transmitted signals coupled with an optical or ultrasonic secondary mode of communication and/or triggering. This combination of dual mode communications allows long range and autonomous tracking of objects to be performed through the RF transmit mode while allowing the local communication (transfer) of data to be performed simultaneously through the secondary mode of communication. The ability to communicate through optical or ultrasonic modes means that radio silence can be maintained (such as when on aircraft) while the total tag functionality and data transfer can be accomplished through the secondary mode. It also means that a tag can be triggered to transmit the RF signal on a discriminatory basis of individual tags.

Most RFID systems utilize additional infrastructure such as fixed readers to affect operation. The ability to utilize existing infrastructure equipment such as mobile computers to affect the data exchange is a significant cost reduction enabling the use of active tags. The RFID tags of this invention can function with existing mobile computers or PDAs.

Figure 1:
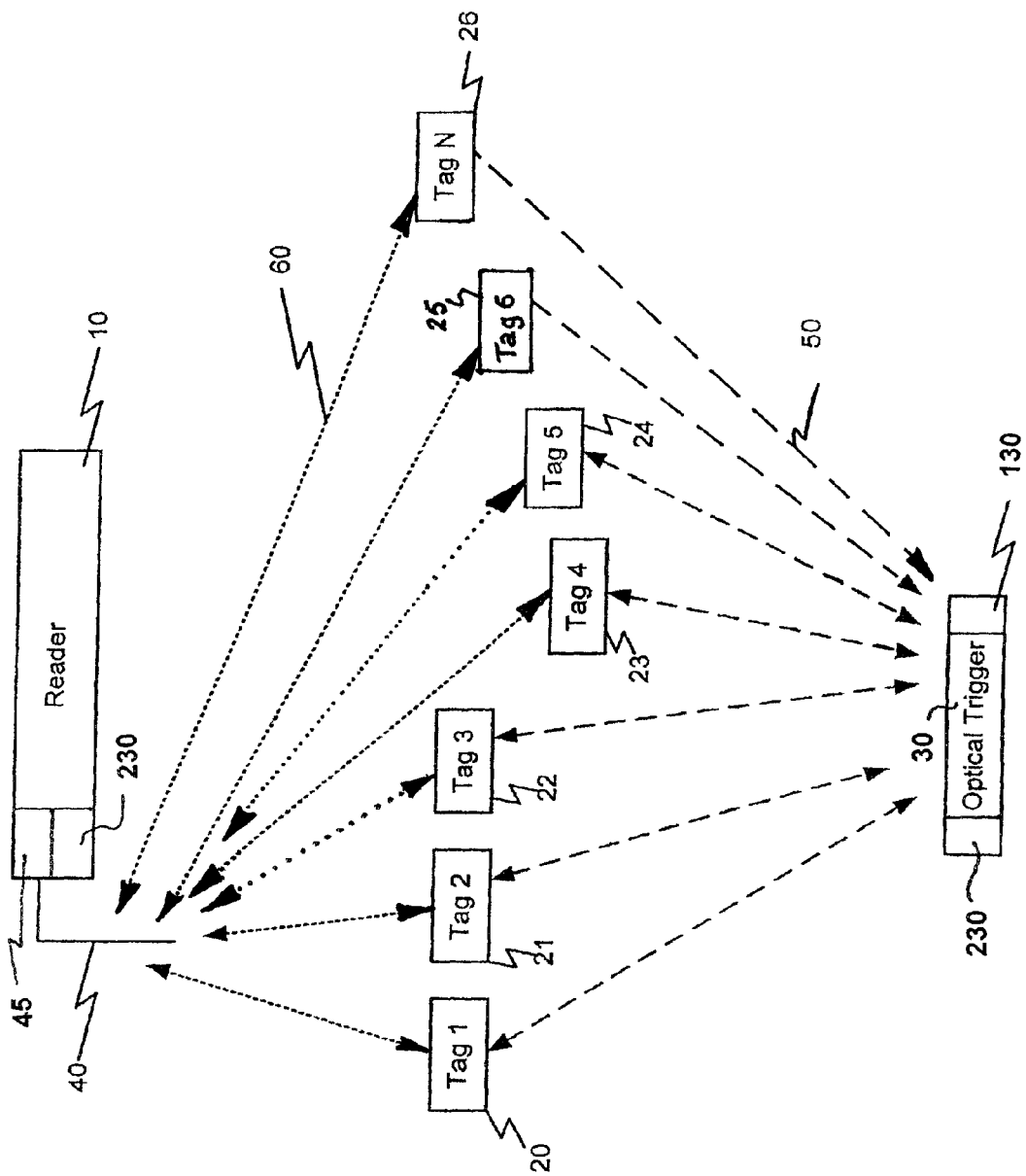
FIG. 1 is a high-level schematic diagram depicting elements comprising an exemplary system of tags, handheld triggers/readers and fixed readers according to one embodiment of the present invention.

FIG. 1 is an overview of elements that can comprise a multi-mode, bidirectional communication RFID system according to one embodiment of the present invention. The system in this example comprises a number of tags 20-26, optical/ultrasound (IR/US) triggers (illuminators) 30 and readers (RF Transceivers, infra-red transceivers) 10 with an antenna 40. Readers are defined herein as devices that receive RF and/or optical/ultrasound signals and transmit either RF or optical/ultra-sound signals and which process these signals. Bi-directionality of signal communications is illustrated by the arrows at both ends of dashed/dotted lines 50/60.

As noted above, triggers and readers can be implemented as specialized equipment or as mobile computers, PDAs, or other types of devices. As described herein, a dual mode (bi-modal) RFID tag is a device that is battery powered and is attached to objects. The tag has two communication modes, a bi-directional optical or ultrasonic mode and a uni- or bidirectional RF mode. The tag identifies the object to which it is attached and also can store information, e.g., from one or more sensor(s), that can be received by it, or retrieved from it by any one or more modes of communication, optical, ultrasound or RF modes of operation. The tag can be used for item tracking, status, identification, location, presence, access control, user authorization (e.g., credit card verification and charge authorization), environmental sensing, data storage, or the like.

In the preferred, exemplary case the tags 20-26, readers 10, and triggers 30 each possess at least dual modes of operation. That is, they can have bi-directional optical and/or ultrasonic modes, and at least receive or transmit, and preferably both transmit and receive, RF modes of operation.

The readers 10 also have bi-directional RF capability including multi-frequency modes of operation. In an exemplary embodiment, the optical frequency domain can be infrared (IR) between $10^{-7}$ to $10^{-3}$ meter wavelengths.

While FIG. 1 illustrates, and the following discussion describes, an optical trigger 30, optical communications, etc. it should be understood that an ultrasonic mode of communication is also contemplated as a secondary communication mode and US may be used instead of or in addition to an optical mode of communication.

The tags 20-26, as will be discussed in greater detail below, can be equipped with receivers and transmitters enabling optical and/or ultrasonic transceiver operation that can effect bi-directional optical and/or ultrasonic modes of communication 50. The tags 20-26 can also transmit signals through the embedded RF mode of communication 60 to the readers 10 or triggers 30. Preferably the tags include RF transceivers to enable the bidirectional RF mode described herein. The triggers 30 and readers 10 can be fixed or handheld mobile devices.

According to one embodiment of the present invention, the tags 20-26 can have several modes of operation including, but not limited to, autonomous transmit, commanded receive and/or transmit, store data, gather sensor data, provide visual responses and more. Thus, the tags 20-26 can provide a mode of operation in which they act autonomously to transmit an RF signal periodically on a pre-selected timing basis. They can also be commanded to transmit stored data via either the optical/US or RF modes of operation. The tags 20-26 can transmit (either optically, US, RF or all three) whenever they are in the presence of an optical communication command signal, e.g., an IR illuminator 30. The triggers 30 and readers 10 can transmit "bulk" signals to all tags 20-26 in their respective fields of view (FOV) or they can transmit commands to a specific tag by way of unique tag ID values or stored data values. They can also transmit to a single tag in close proximity without the "command" signal being received by an adjacent tag.

The commands, in the exemplary embodiment, cause a tag to transmit both its unique identification (ID) value along with the ID value of the causative communication device, i.e., trigger 30, via the RF mode 60 or optical/ultrasonic mode 50 to readers 10, thus enabling individual tags and communication devices to be both identified and correlated. The infra-red (optical) or ultrasonic modes of communication 60 can also be utilized to transmit data and/or commands to and from the tags 20-26. These commands include, but are not limited to, anti-collision RF algorithms, "search for" parameters (e.g., "are you there? If so, answer back" queries; check for sensor data and send, etc), mode changes (switch from IR to US or RF; switch from RF to US or IR; etc), changes in authorization (accept and verify additional/different authorized user ID/access/credit amount data) and the like. Such communications can be stored as data on the tag 20-26 and transmitted via the RF mode 60 as required.

The optical/ultrasonic modes may be initiated by triggers 30 in the form of either handheld or fixed devices in relative proximity to the tags 20-26, typically 0-10 meters in range, and (1) cause data to be stored on the tags 20-26, or (2) cause the tag to transmit certain data via the RF mode 60 (an example of bi- or multi-mode linkage), or (3) transfer data through the optical/ultrasonic communication mode 50, or (4) transfer command and control information to the tags 20-26. By reducing the transmitted power of the optical device, communications can be reduced to a distance of several centimeters, thus communications can be restricted to a single tag even in the presence of multiple tags.

This local triggering by one mode of illumination (e.g., IR/US illuminator) of an RF signal from the tag provides the ability to distinguish a single RFID tagged device from among a plethora of similar devices that may be in the general vicinity (singulation). It also enables the tagged item ID to be associated with the ID of the triggering device, such as in processing stations or during delivery for issue and receipt functionality, both examples of inventory control, such as In Transit Visibility and Total Asset Management. It is an inexpensive and reliable method of transferring data or commanding an alternate tag mode of operation (the linking or switching of modes within the tag by its processor). The exemplary infra-red mode can utilize both a unique protocol as well as using the IrDA industry open standard protocol. This latter attribute enables existing devices such as Personal Digital Assistants (PDAs) or mobile computers to effect the bi-directional transfer of data, i.e., to be used as a trigger 30. The RF signal can be received locally by a handheld, local mobile computer or it can be received by fixed, more remote readers that, in turn, relay the data back to a central computer data base. The optical signal does not require direct line of sight as it can be reflected off of most surfaces and this "multi bounce" signal has sufficient energy to effect tag triggering (linking for bimodal switching). The infra-red signal can penetrate clothing, paper and opaque solid surfaces.

As an illustrative example of this application, consider a processing operation in which the tags on hundreds of tagged items are present and are periodically transmitting, or beaconing, via RF their ID and/or data which is received by reader devices, processed and transmitted to a database for additional processing or displayed for operator action or knowledge. This function enables automated inventory to be implemented, for instance, as part of TAM. When a particular tagged item is to be processed, for instance, when a high pressure gas bottle is to be filled with a specific gas, the equipment or operator needs to be able to identify the specific ID of the container so the container ID and fill material can be correlated. The localized, secondary mode of communication described above, i.e., the optical or ultrasonic mode, allows that specific triggering (singulation) to be effected. This same individual tag triggering can be used during deliveries when a driver identifies which specific tagged item is being dropped off ("issued") or picked up ("receipted"), an example of ITV.

Figure 2A:
FIGS. 2A-2C are diagrams illustrating the modes of signal functionality between the various elements of the system illustrated in FIG. 1.
Figure 2B:
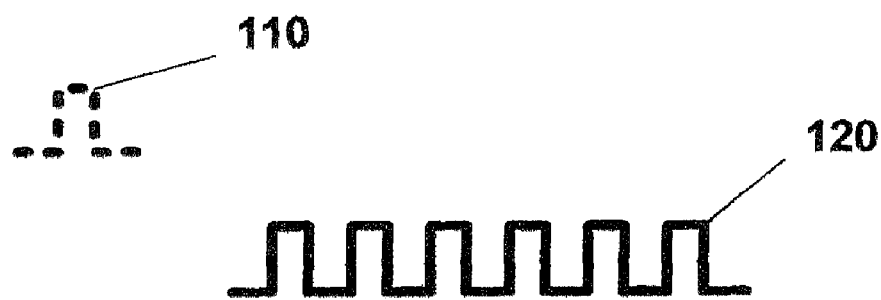
Figure 2C:
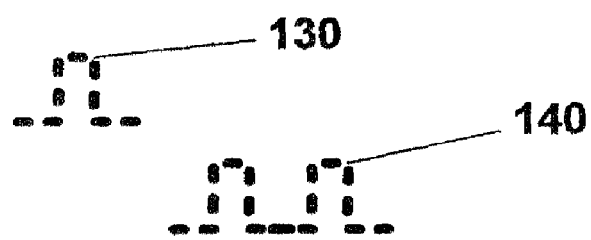

FIGS. 2A-2C are overviews of the primary modes of signal transfer between elements of the system illustrated in FIG. 1. FIG. 2A illustrates Mode 1 wherein the periodicity of the periodic RF transmission 100 (beacon mode) of which the tag is capable is shown. In this, "I am here" mode, the tag repeats an RF output signal 100 according to parameters that may be determined and set into the tag pre-programmed at the manufacturer, or transmitted optically to the tag. FIG. 2B illustrates Mode 2 wherein the RF output 120 is triggered (bi-modally linked) from a direct communication from the optical or ultrasonic trigger signal 110. In this mode of operation the tag decodes the incoming optical or ultrasonic signal 110 and transmits an RF signal 120 as commanded by this optical or ultrasonic input signal 110. This transmitted output signal 110 could be RF or optical (or ultrasonic) or both and could include specific stored data (including, e.g., from a sensor) as well as the ID of the tag and trigger device. FIG. 2C illustrates Mode 3 wherein the optical or ultrasonic input signals to the tag 130 triggers an optical or ultrasonic only response 140 to be transmitted (bi-directional communication example).

Figure 3:
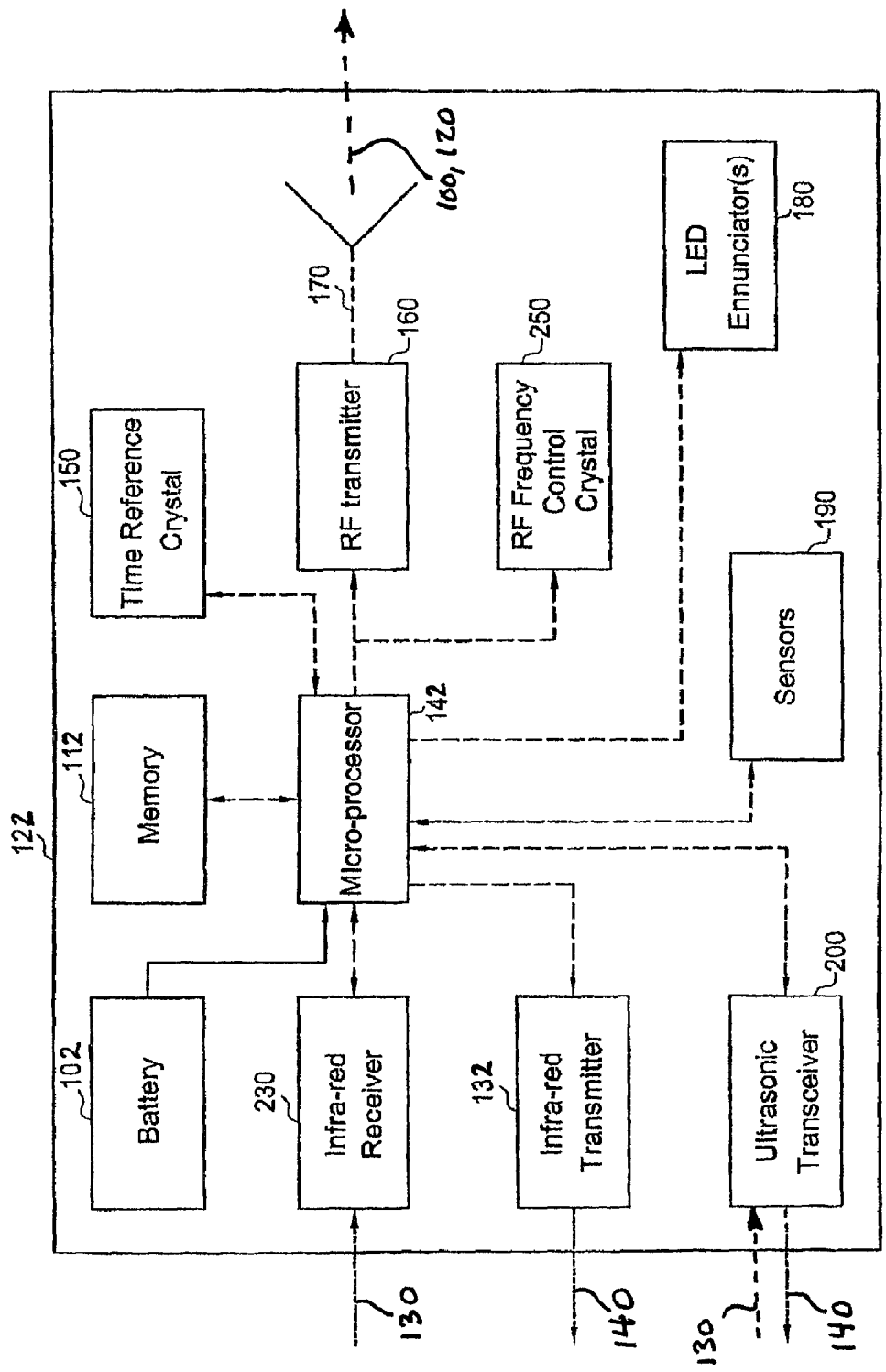
FIG. 3 is a block diagram of an exemplary embodiment of the tag portion of the system illustrated in FIG. 1.

FIG. 3 is a block diagram of an exemplary embodiment of a dual communication mode tag. The system can include an optical (IR in this example) transmissive case 122, an optional Ultra-Sonic (US) transducer/transceiver 200, and/or optical (preferably IR) receiver 230 and an optional optical (preferably IR) transmitter 132 and, a battery power supply 102, a microprocessor 142, and an RF transmitter 160. While the optical transmitter 132 may be considered to be optional, by adding the IR transmitter 132 to the tag, the tag is then enabled with bi-directional, rather than unidirectional, optical communications. Optionally, the tag can also incorporate additional memory and sensors as will be discussed below.

In the preferred embodiment, the case 122 is molded of optical transparent materials so as to encapsulate the entire tag. Thus, the case 122 can provide mechanical, environmental, and enhanced Intrinsic Safety attributes. The case 122 can be molded of optical transparent plastic which enables the optical (IR in the exemplary embodiment) signals to pass through in a bi-directional manner with low loss. The US transceiver 200, if any, can be mounted on the external surface of the case 122 such that signals are generated and received in free air. Alternatively, the case can be molded onto the US transceiver 200 to maintain an environmentally sealed case design. The ultrasonic transceiver 200 can be used in lieu of or in addition to the IR transmitter 132 and receiver 230. Visible output pulses from one or more optional colored LED enunciators 180 also can be seen through this case 122 to indicate a current state or functions of the tag.

Power from the battery 102 is shown as a solid line between the battery 102 and the microprocessor 142 as it is, typically, continuously supplied to the microprocessor 142. The microprocessor 142 can maintain a continuous mode of operation to receive the optical signals and to control the periodic operations of the tag. Power can be gated by the microprocessor 142 to the various other tag elements as appropriate.

The microprocessor 142 executes instructions stored in memory internal to the microprocessor 142 or in the external memory 112. These instructions cause the microprocessor to control the operations of the tag and perform the functions described herein. The microprocessor 142 can have several modes of operation to conserve power regardless of the functionality incorporated. For example, it may have a "sleep" mode wherein only the internal clock is continuously powered. This clock can be used to calculate predefined time periods during which additional functionality may be enabled. These time periods are controllable through the optical input mode of operation.

When data is received by the tag, the data can be stored in either the internal memory of the microprocessor 142 or in the optional external memory 112. Since the microprocessor 142 contains built in memory, the external memory 112 may be incorporated when the data storage requirements exceed the on-board microprocessor memory capability. According to one embodiment of the present invention, the memory 112 can be written to via the optical mode of operation and data stored in it can be selectively retrieved either through the optical mode or through the RF mode.

Additional sensors 190, can be incorporated for sensing parameters including, but not limited to, temperature, g-shock, strain, humidity, and pressure. The timing for power application to devices other than the microprocessor 142 can be calculated from an internal microprocessor clock and the periodicity of the functionality can be predetermined and defined by the firmware executed by the microprocessor 142. The tag can then transmit such sensed data either thru the optical or ultrasonic or RF modes of operation.

The time reference crystal 150 can be incorporated for applications in which the tag is utilized as a data logging device. In this application the real time of a recorded event, such as a sensor parameter or an optical communication, can be stored in memory and the actual time of event occurrence determined from the downloaded data. That is, an accurate time can be associated with events and communication. This capability allows the event (sensed data, optical communication, etc.) to be associated with the "real time" (date and GMT referenced). It should be noted that this time reference crystal 150 is not required for correcting the timing of data bit pulses that are used to convey data to and from the tag. These temperature induced errors can be handled by the algorithms described below.

As indicated above, the exemplary tag illustrated in FIG. 3 includes several optional elements. By utilizing the various elements, as appropriate, and software stored in memory internal to the microprocessor 142 or in the external memory 112 and executed by the microprocessor 142, the tag can operate in a variety of modes and perform a variety of functions. For example, the tag can have a periodic RF transmit only mode. In this mode the tag can transmit the tag's ID value on a periodic basis. This functionality permits auto tracking of the tag, and therefore the object or person with which the tag is secured or associated, e.g., a guest, such as a child, in a theme park, on board a cruise ship, or the like.

In another example, the tag is activated or triggered by the optical (e.g., IR) or US mode to communicate by a different mode, e.g., RF. Thus, the tag can transmit RF automatically in a beacon mode, or upon receipt of the optical trigger signal, the tag is programmed to transmit RF upon command. The optical communication mode provides the ability to transmit the ID value of the optical trigger or reader unit (reader is an IR illuminator) to the tag which in turn transmits the unique tag-embedded ID value as well as the trigger ID, thus establishing the identification of the unique trigger used to contact the tag, that is, the illuminator associated with the tag. Knowing the illuminator's dedicated location also locates the tag and object to which it is secured. Data can be transmitted to the tag for storage and data can be commanded to be transmitted from the tag via its RF mode or optical mode from this optical input communication mode of operation.

It is important in tracking assets to not only ascertain when they are in the presence of an IR trigger (illuminator) signal but also to ascertain when these tags are no longer in the presence of any IR trigger or a specific IR trigger. In other words, when a tag is in the presence of an IR trigger it will broadcast the corresponding trigger ID (or/and the object ID) and therefore the predetermined location of the IR trigger renders the tag's location as known. However, if the asset is removed from the IR trigger illumination field (FOV) and does not enter another IR illuminator field, then the asset tag is essentially "lost" in an unknown location. An attribute of the inventive system is that the tag can be programmed to transmit an alert signal, for example a trigger ID of "00" (regardless of whether the trigger/illuminator is IR, US or RF), whenever the tag is not in the field of an IR illuminator. In this manner, it is evident in the monitoring administrative LAN or WAN network database, that an asset is located somewhere where there is no IR illuminator, or one different than an area in which the object should be located. Further, if the "00" alert signal is in the RF mode and is received by a system reader, then the location of the tag is definable as within the RF reception range of the tag-reader combination. Thus by adjusting the range of the tag RF, the asset manager can determine that the object is, or is not, on premises, but mis-located. Further refinement is possible by using the received signal strength of the tag as a coarse indicator of location from the reader, e.g., by RF triangulation. Of course, as described above, the tag can be programmed to acquire and report the ID # of any illuminator it "sees" in its FOV, and by correlation of the illuminator ID #s to their assigned location, locate precisely in which room or illuminator FOV the tagged object is located. Thus, as a tagged object passes from room to room, from room to hall, from hall out an exit door, to a loading dock, or out of a yard area, the in transit location of the tagged object becomes visible. The network asset management computer can be configured to archive such location tracking histories, sound or send silent (e.g., computer screen pop-up) alerts or notify security and law enforcement personnel if an asset that is not supposed to leave the premises is leaving or has left, and print out an archival record. In addition, the inventive system can be programmed to direct a command signal to the tag on the object being moved outside its authorized use area, to activate a lock, change a password, initiate a new level of administrative security or authorization control, or other disabling device.

Figure 4:
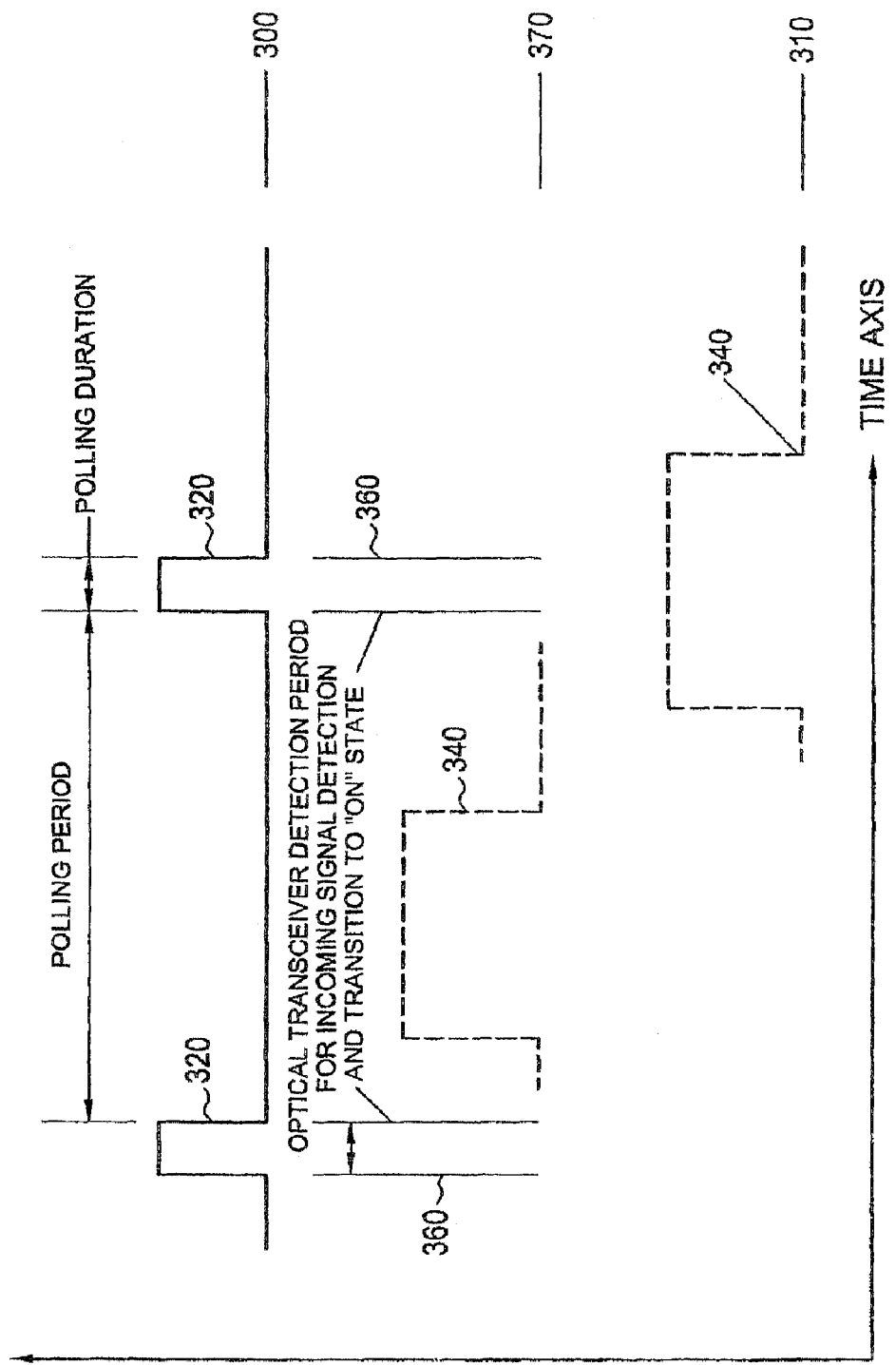
FIG. 4 is a diagram illustrating, according to one embodiment of the present invention, the relationship between polling periods, polling durations, transition from the polling mode to the data communication mode of operation and shows the approximate relationship of the incoming infra-red "wake-up" signals with respect to the polling duration and to the receive period of the infra-red transceiver.

FIG. 4 illustrates, with respect to the inventive tag, the relationship between polling periods, polling durations, transition from the polling mode to the data communication mode of operation and the approximate relationship of the incoming IR "wake-up" signals with respect to the polling duration and to the receive period of the IR transceiver. In this example, line 300 illustrates the repetitive polling ("looking for signal") that is conducted by the tag. By way of example, the timer in the microprocessor 142 calculates the polling period, wakes up the optical receiver 220, for the polling duration period 320, and determines if a valid communication signal is present. If no such signal is present 360, the microprocessor may return to the sleep mode until it reaches the subsequent polling period at which time it can repeat the polling duration functionality.

FIG. 4 illustrates in line 300 the functionality of the inventive tag wherein the microprocessor "wakes up" and looks for a defined duration, 320, for an incoming optical signal 340, line 370. The incoming pulse 340, line 310, is shown occurring outside of the duration 320 of the polling period time window 360. It is not necessary that these two events 320 and 340 align leading edge to leading edge. The incoming pulse 340 is detected during a portion of the polling period 320. This is illustrated in line 310 where the duration of the incoming pulse train 340 is present during the "look" detection period 360. In this mode of operation of this embodiment, when the microprocessor detects an incoming optical signal, the microprocessor can supply full power to all or some of the circuit elements and receive the incoming encoded optical signal (pulse train) 340. In the exemplary implementation, the wake-up pulse train 340 is preferably present for two or more polling duration events 320, so that if the tag detection 360 does not see the illuminator pulse in two successive periods, or N times out of X successive periods (those values are configured into the tag), then the tag is not in the FOV of the illuminator, the consequences of which have been described above. The timing and duration of each event, 320, 340, 360 are determined by desired system response times. The values can be selected based on total system responses.

Figure 5:
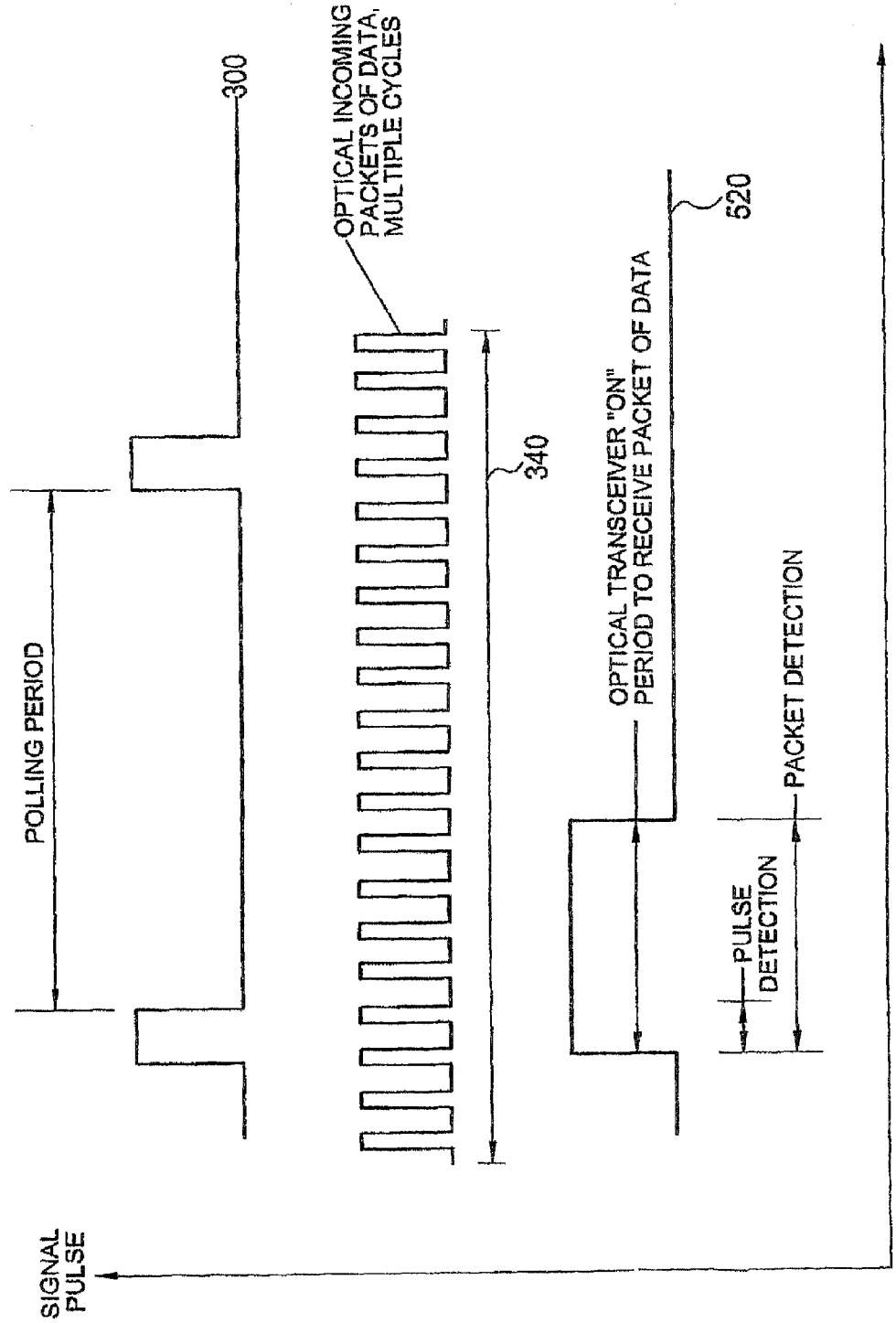
FIG. 5 is a diagram illustrating one embodiment of the present invention, the relationship between polling periods, polling durations, transition from the polling mode to the data communication mode of operation and shows the approximate relationship of the incoming infra-red "wake-up" signals with respect to the polling duration and to the receive period of the infra-red transceiver.

FIG. 5 illustrates, an exemplary relationship between polling periods, polling durations, transition from the polling mode to the data communication mode of operation and the approximate relationship of the incoming infra-red "wake-up" signals with respect to the polling duration and to the receive period of the IR transceiver. In this example, the signal detection repetitive polling periods 300 from FIG. 4 are illustrated. The incoming optical signal packets 340 are illustrated as a series of digital pulses. When a "wake-up" packet is transmitted, the packet can be repeated to ensure that it overlaps the polling durations of the tag and is sufficiently long that the tag's microprocessor can detect it. Any pulse train of the proper timing is sufficient to cause the microprocessor to process an incoming signal, thus enabling the wake up function to occur even if the incoming signals did not represent the beginning of the data packet stream as illustrated in FIG. 5. At line 520 the presence of a packet is detected within the polling duration and the microprocessor, being fully "on", decodes the remaining pulse train as an indication to stay fully energized to detect the sub-sequent embedded data.

Figure 6:
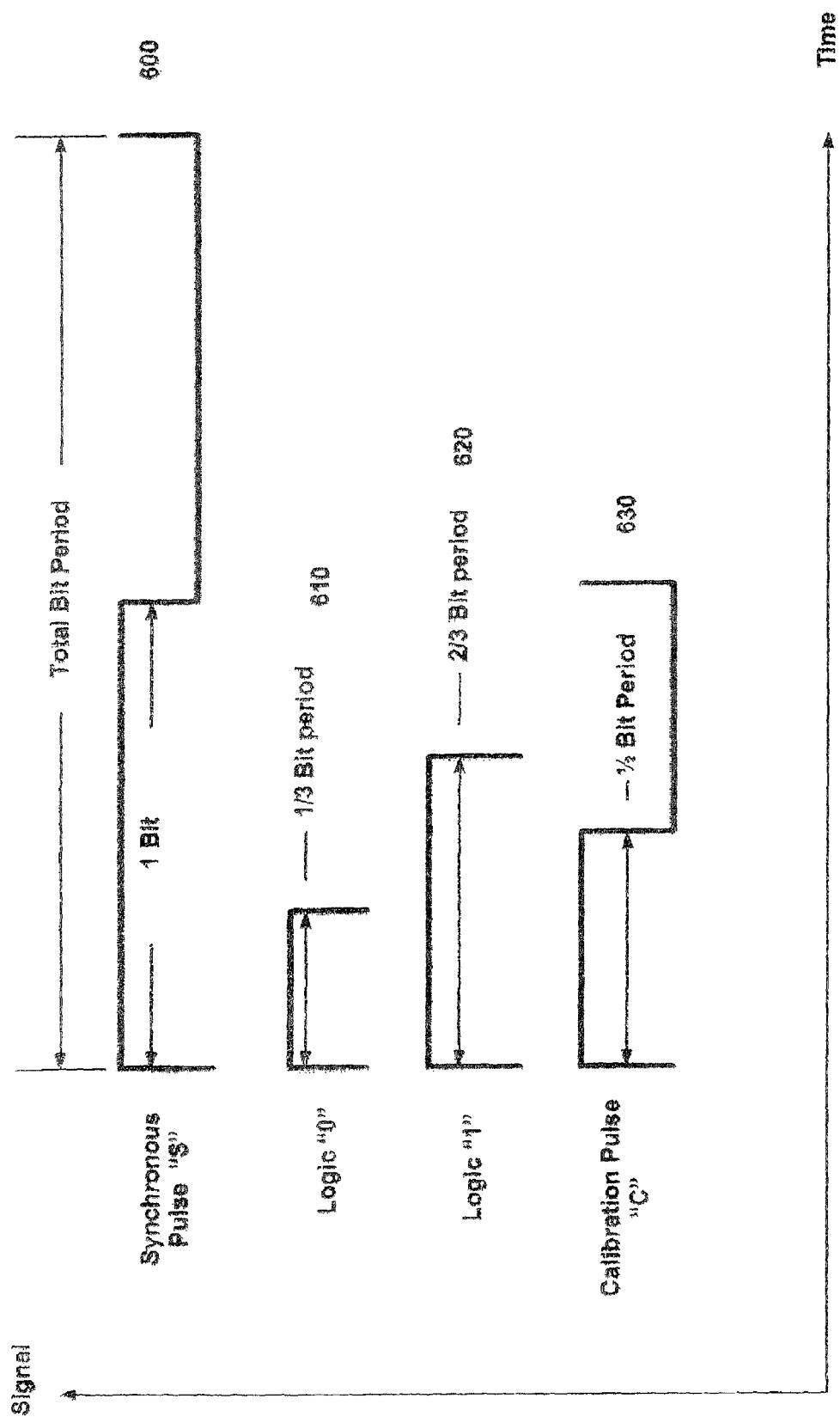
FIG. 6 is a diagram illustrating the bit period for the calibration, zero, one, and synchronous bits according to one embodiment of the present invention.

FIG. 6 illustrates the bit period for the calibration, zero, one and synchronous bits and timing relationships between the various types of pulses according to one embodiment of the present invention. In this example, the four logic states are "synchronous", "calibration", "logic 1" and "logic 0". The distinguishing characteristic of these states can be the duration of the ON and OFF, i.e., high and low, pulses. The synchronous bit can be a combination of high and low states as shown in line 600. According to one embodiment of the present invention, the "Logic 0" state 610 can be defined as a pulse of approximately ⅓ the total duration of the sync pulse in the "ON" state and ⅔ in the "OFF" state. A logic 1 state 620 can be defined as ⅔ of the sync pulse duration in the "ON" state and ⅓ sync pulse duration in the "OFF" state as shown in line 620 of FIG. 6. A calibration pulse 630, from which all subsequent timing may be based, can be ½ synchronous pulse duration in the "on" state and ½ in the "off" state as shown in line 630 of FIG. 6. A synchronous state can be defined as an "on" condition for a period of 2 times the total pulse duration of the calibration pulse followed by an "off" condition of 2 times the total pulse duration of the above calibration pulse.

Figure 7:
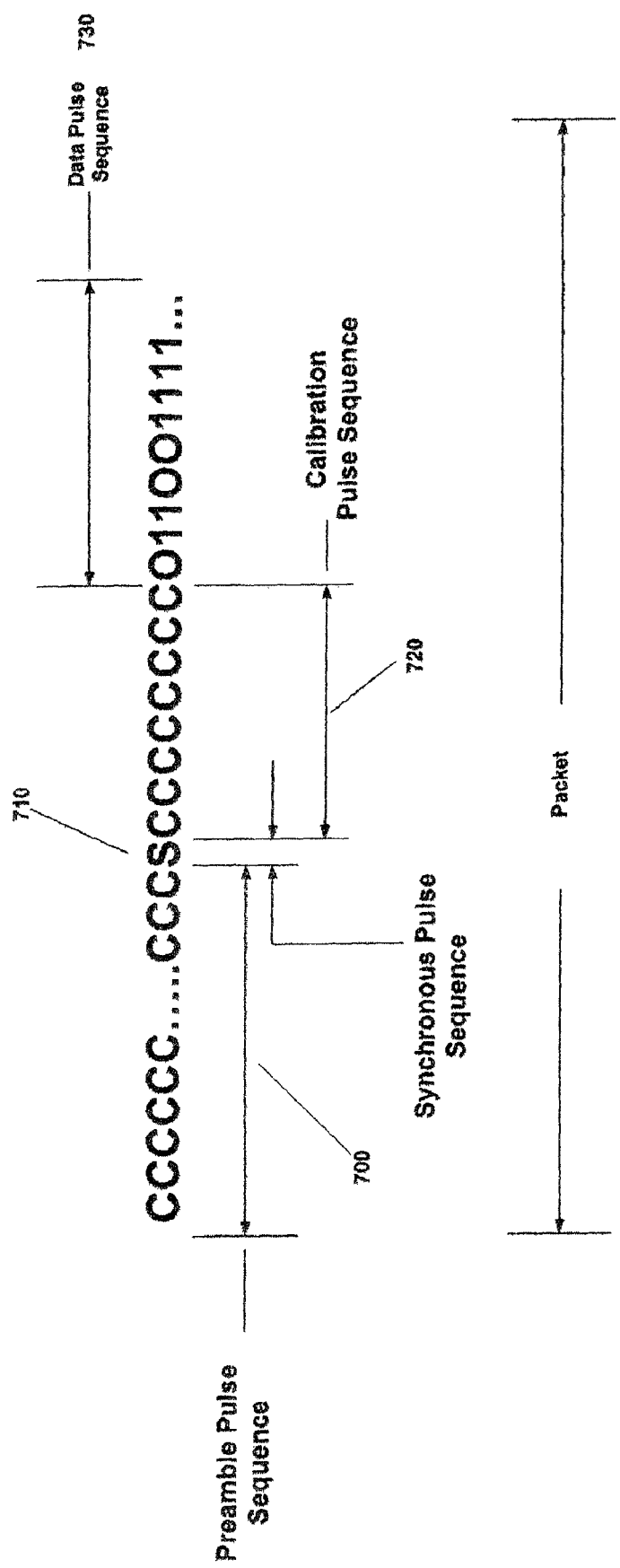
FIG. 7 is a diagram illustrating the relationship between bit periods transmitted in communication packets according to one embodiment of the present invention.

In this exemplary embodiment, the packet or stream of bit periods transmitted by the secondary optical triggering device can be comprised of a series of these bit periods. While not limited to any specific number, an exemplary bit sequence can be comprised of a series of calibration bits followed by a synchronous bit period followed by eight additional calibration bit periods followed by a data sequence as determined by the data or command being transmitted. A packet can consists of a series of pulses the respective characteristics of which are illustrated in FIG. 7. The preamble portion 700 can be the portion of a packet used by the tag to detect the presence of an incoming optical signal from the illuminator. This preamble pulse train can be a series of on and off (one and zero) pulses that are generated by the trigger using a time dependant time reference. Embedded within this packet may be a synchronous pulse train "S", 710, that can be detected by the microprocessor of the tag and used to indicate pulse train sequencing. The tag's microprocessor, having detected the synchronous signal, can utilizes the next portion of the packet 720 to accurately detect and record the timing of the leading edges of the calibration pulses 720. The microprocessor may store this timing and use the timing information to decode the final pulse sequence 730, 1s and 0s of an embedded command or transfer of data. Once the tag is fully powered it can decode data or commands that are being transmitted by the triggering device. In this mode the data packets may be of the nature illustrated in FIG. 6.

According to one embodiment of the present invention, these data or command packets may be repeated three or more times to ensure that the microprocessor of the tag has received the entire packet. Data and command packets can be transmitted with a cyclic redundancy check (CRC) to validate the integrity of the data or command. For mode #1, as described above, the incoming signal would be used to calculate a time for functioning the RF transmit. In other modes either commands or data transfers would take place.

Another aspect of the present invention includes a method of eliminating or reducing the impact of temperature induced variations in electronic components which in turn affect the timing and performance of the data transfer signals. The method utilizes a pre-cursor set of signal pulses the timing of which can be measured to determine the temperature induced effects. Once determined, the timing of the pulses can be applied to all of the signals and the overall performance of the data transfer can be improved.

Therefore, according to one embodiment of the present invention, a tag can receive data without the use of a precise time reference resonator element to maintain the accurate timing of data bits. This attribute is correlated to the ability to ensure a detection of incoming data during the polling duration period. In order to accomplish this functionality, a ratio of "ON", or 1 states, to the "OFF", or 0 pulse states for bit periods can be used. Four different logic states are encoded in this manner. FIG. 6 illustrates the pulse ratios for these four states.

This sequence is shown in FIG. 7. In this example, the preamble serves to stabilize the tag hardware by enabling full processor power to all of the microprocessor elements and the optical or ultrasonic transceiver to be applied (turned on) and the parts to reach an equilibrium state prior to the following sequences which do transfer commands and data. At the completion of the calibration bit ("C" bit) period sequence, a synchronous bit ("S" bit) period may be transmitted. This "S" bit sequence indicates to the microprocessor that the next fixed sequence is a calibration sequence.

In this embodiment, the calibration sequence that follows the synchronous bit period comprises multiple pulses to stabilize the functionality. This sequence allows the elimination of the accurate timing reference crystal that other RF systems use to eliminate temperature induced drift or inaccuracies. In an exemplary embodiment, this calibration sequence can be a fixed number of bits with the last bit analyzed by the microprocessor to determine the total bit period.

Figure 8:
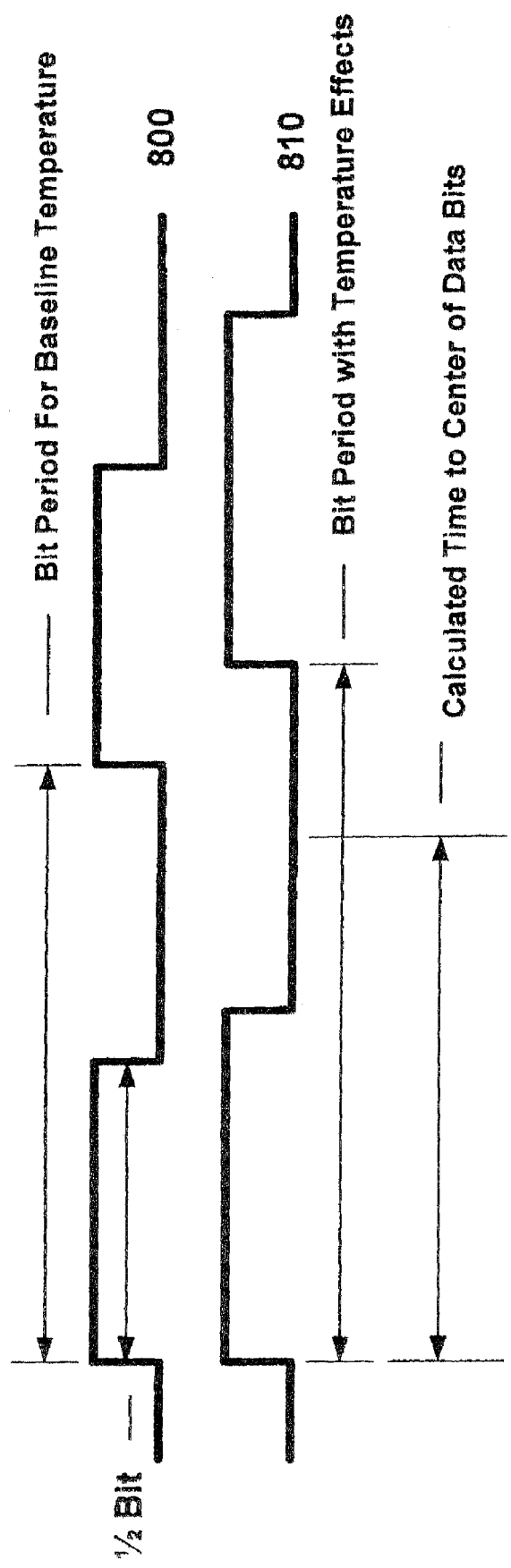
FIG. 8 is a diagram illustrating the relationship between bit periods when temperature variation adjustments are incorporated according to one embodiment of the present invention.

The microprocessor determines the time between the two leading edges of the last calibration pulse. This determination can be aided by the choice of a ½ "ON" and ½ "OFF" pattern for the calibration pulse as described above. The total period of this bit can vary significantly due to the temperature effects on the microprocessor clock which can cause the bit period to change by plus or minus 5% or more. With reference to FIG. 8, line 800 illustrates the normal pulse width associated with a nominal temperature condition. Line 810 illustrates the effects of temperature on the pulse width, i.e. either shortening or lengthening the pulse. Normally this effect would obviate the ability to decode subsequent data trains since most processing algorithms use the correlation between leading edges as the detection of a bit sequence (timing). This shifting of leading edges due to temperature drift would not allow accurate data decoding. However, in accord with this invention, by measuring the time (length) of a calibration bit, the timing associated with all of the data bits can be determined. The effects of temperature are not manifested during a short time duration such as that required to transmit data. By determining the center of ½ of a calibration pulse width, as shown in FIG. 8, line 810, these variations due to temperature can be determined. Since the pulse widths are temperature invariant over the time period of signal and data transfer, the microprocessor can establish the timing associated with the pulse train and calculate subsequent bit patterns. The determination of whether the bit pulse is either a "1" or a "0" state condition as determined by analyzing the 0 or 1 state condition associated with each data bit based on the timing derived for ½ of the calibration bits, i.e. by analyzing each 0 or 1 bit at the midpoint of a calibration pulse the logic state of 1 or 0 is readily and accurately determined. This allows accurate data transfer in the presence of temperature induced timing variations without the incorporation of a separate timing reference resonator (crystal) in the circuit.

Figure 9:
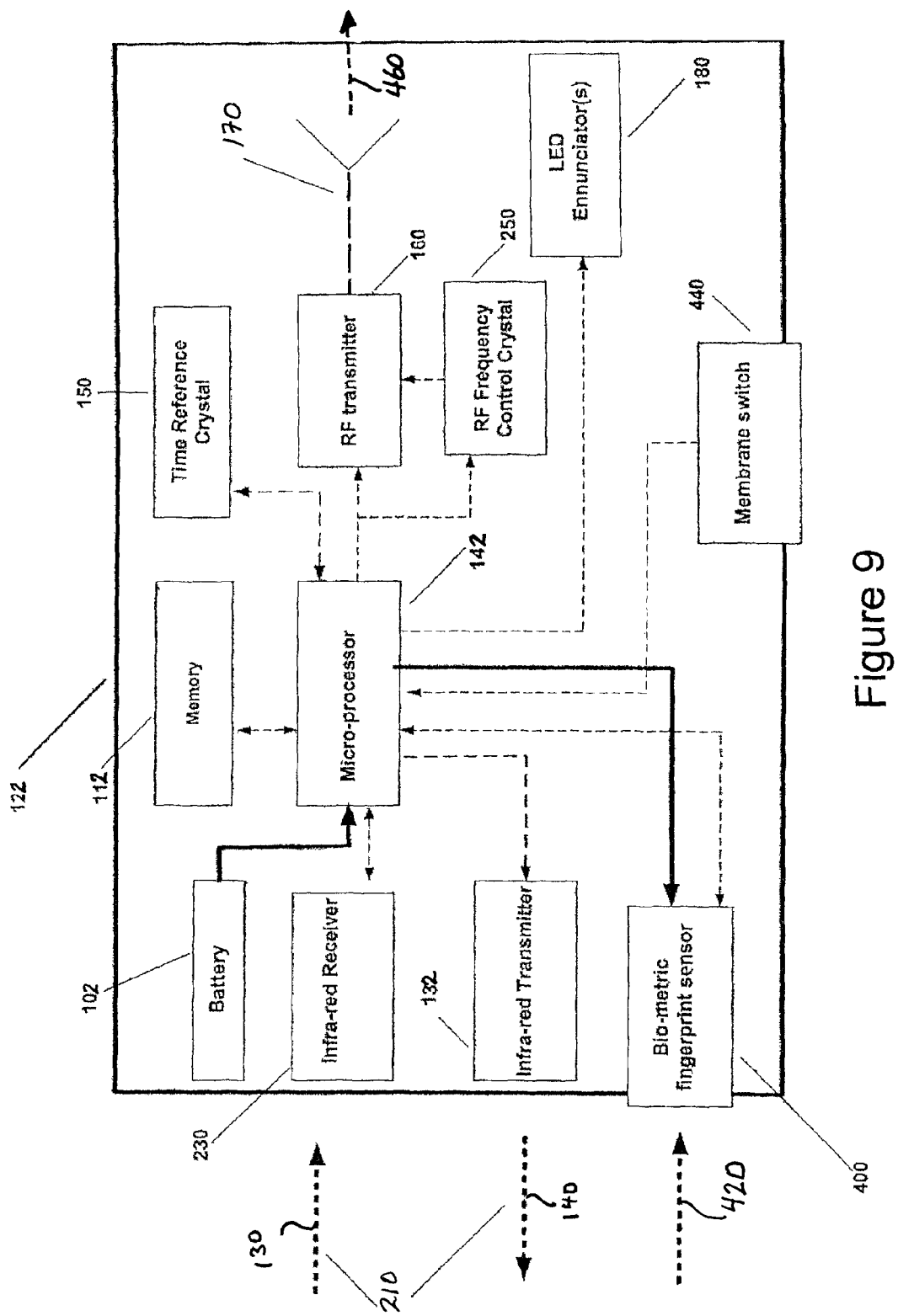
FIG. 9 is a tag block diagram inclusive of a membrane switch and bio-metric sensor located on the outer surface of the tag.

FIG. 9 illustrates an exemplary tag of FIG. 3 in which the sensor 190 of FIG. 3 is a bio-metric sensor, identified as 400 in FIG. 9. A membrane switch 440 and bio-metric sensor 400 are on the outside surface of the tag enabling external use of these two devices. The RF device 460 is a transceiver, not just a transmitter. The rest of the tag block diagram items and functions are the same as shown in FIG. 3, as described above.

In operation, the microprocessor 142 is connected to the battery at the time of manufacture. The microprocessor 142, maintains an internal clock which operates at very low power consumption levels, typically in micro-amperes of current. The microprocessor 142, is programmed with firmware which periodically causes the device to "wake up" and perform certain functions. Typical of these functions are a check of the infra-red receiver 230 to see if signals are present, a check of the RF transceiver 460 to see if signals are present and a check of the incoming switch signal line from the membrane switch 440. If any of these inputs have signals present, the microprocessor 142 transitions to a full power mode wherein the incoming signals are analyzed and the appropriate action taken.

For example, if an IR illuminator signal is present at the IR receiver 230, the microprocessor 142 will process the incoming signal and take appropriate pre-programmed actions, such as transmitting the IR illuminator ID coupled to the tag ID via the RF transceiver 160 and antenna 170. In the example of a bio-metric mode of operation, the microprocessor 142 will, upon membrane switch 440 closure, provide power to the fingerprint sensor 400 and enable this device to obtain a scan 420 of fingerprint features, compare this feature set to the stored feature set and if they match, this sensor will provide a signal to the microprocessor 142. The microprocessor 142 will then enable the programmed functionality such as RF transmission 460 or IR transmission 140 to occur, enabling further RFID tag actions such as a point of sale transaction to take place. An LED may be used to illuminate the finger-print sensor (reader).

Additional functionality enabled by this inventive system example includes the ability to transmit a signal to the RF transceiver 160 which will be processed by the microprocessor 142 and subsequently cause one or more of the LEDs 180 to "blink". This signal can be used for a multitude of purposes such as remotely signaling the tag holder, such as a child to "return to parents", confirm the sales transaction was successfully transacted, that access is granted (green LED) or denied (red LED light) goes on, or that a time lapse has occurred. In addition, an LED flash chip may be in the LED array 180 to take a picture of the tag/card user at the time of the event. Of course, the time clock of the card can be embedded with the transaction or event data saved into the microprocessor memory, and dumped via IR illuminator command via RF transceiver 160 to an external reader connected via network to an archival monitoring computer.

The basic tag functionality with "Wake up" and other characteristics remains as described above. In order to preserve a maximum of battery power, the on-board bio-metric sensor 400, which is relatively higher power-consumptive than the other described tag elements, is always in a power off state. (As noted above, the bio-metric sensor does not have to be on-board, but may be associated with another device, such as a PPD, door lock, piece of equipment, computer, etc which has illuminator capability to communicate the bio-metric data to the tag for comparison and verification) In this state the device retains all of the described IR/US/RF functionality not requiring the added security of bio-metric "signatures" (verification").

When the functionality of bio-metric signature confirmation is desired, the membrane switch 440 is depressed. Depressing this switch changes its state from "normally open" to a momentary "closed" contact state. This momentary switch contact closure is detected by an I/O port on the microprocessor 142 and power is supplied to the bio-metric sensor 400. The power "ON" duration is finite, the "ON" state of the sensor being controlled by the microprocessor 142 as set by factory firmware for a period of seconds. This may be signaled to the user by the LED array 180, or by the bio-metric scanner illuminating LED turning ON. In the "ON" state, the user will press his finger on the sensor 420 or swipe it across an illuminated reader slit, and his bio-metric fingerprint "features" are read by the sensor. This read data set is internally checked by the tag microprocessor against a feature set of characteristics unique to this user stored in the tag database. In a first alternative of operation, when the identity is determined by the bio-metric sensor 400, it will transmit a "matched feature set" signal to the microprocessor 142. In a second alternative, the bio-metric sensor sends the read data set to the microprocessor 142 which does the comparison with the stored data set to determine if the read data is that of an authorized user.

This microprocessor then transmits a signal via RF, IR or US or multi-modally, to a reader, indicating the predetermined tag ID for this user along with a verification or an authorization to perform a secondary act such as purchasing an item, providing access, opening a lock, etc. The microprocessor will then terminate power to the bio-metric sensor until the membrane switch is activated again.

Since this tag is equipped with an RF transceiver, another bio-metric feature set data can be transmitted from a remote source (illuminator or reader) through any one of the multi-modes, IR, US, or/and RF, to the tags. In this application, a feature set, say fingerprint features, and control information such as number or venue of authorized usage would be transmitted from the system network directly to the tag transceiver 160. The tag microprocessor 142 would communicate the feature set to the bio-metric sensor 400, or retain it in memory 112, thus enabling a second person's signature to be used to authorize the tag's intended use. This same data could be transmitted to the tag via the IR mode of operation.

As illustrated by reference to both FIG. 3 and FIG. 9, in addition to the environmental sensing, a bio-metric sensor that "reads" the one or more user specific identification characteristics and can therefore record or limit tag use unless one or more specific pre-verified user(s) has initiated the tags' communication link is invaluable as establishing user ID, a pre-requisite for enhanced utility. Such bio-metric sensing ensures that only a single authorized user or group can make use of the tag's ID/value as the tag will be prohibited from transmitting its ID/value unless the bio-metric sensor has identified the user and internally authorized the transmission of data from the tag to a reader. Such applications include verifying the actual user when the tag is used as an automatic Point of Sale or toll collection tool, e.g., an in-vehicle reader accepts the driver's ID and permits operation (unlocks the ignition) when the bio-metric sensor has validated the presence or/and authorization of a user. This prevents fraudulent use of an issued tag.

A second such application is the use of the inventive tag to enable Point of Sale purchasing transactions. The user verifies his/her bio-metric ID, and upon match, is authorized to complete the sale, e.g., by scanning a credit card. The bio-metric ID can serve as the user's signature. The inventive infra-red/RF tag's bimodal communication mechanism transmits the bio-metric verification to the card scanner, which functions as an illuminator and reader. The credit card can contain the inventive tag and bio-metric sensor, so that the authorization and entire transaction occurs without contact.

As the customer approaches the sales counter with the credit card in hand, the Pay Point Device illuminates the tag embedded in the card, requesting (commanding) the tag to send verification to the PPD. The user places a finger on a touch pad area of the card, the data is read and compared with the authorization profile in the tag. If there is a match, the card, via the tag RF responds to the PPD reader, and the transaction is completed. In addition, the card memory can decrement by the amount of the total transmitted to it by either IR or RF.

Where the card does not have a finger-print reader, the customer puts his/her finger on a reader at the PPD. The data is sent to the card tag by IR. The data is compared to the data set profile in memory, and if there is a match, the tag sends back by RF to the PPD that the transaction is authorized. The PPD, at the time of sending out the bio-metric data, can also send to the tag the amount of the purchase. The card memory can compare to balance available, decrement if sufficient, and then send out the authorization code via RF. If there are insufficient funds, a different code is sent and the transaction does not proceed. These are just two of the many ways in which the inventive bi-modal tag may be used in connection with point of sales and credit card transactions using either tag-embedded sensors, or remote sensors, e.g., sensors associated with illuminators, readers or combined illuminator/reader devices.

Figure 10:
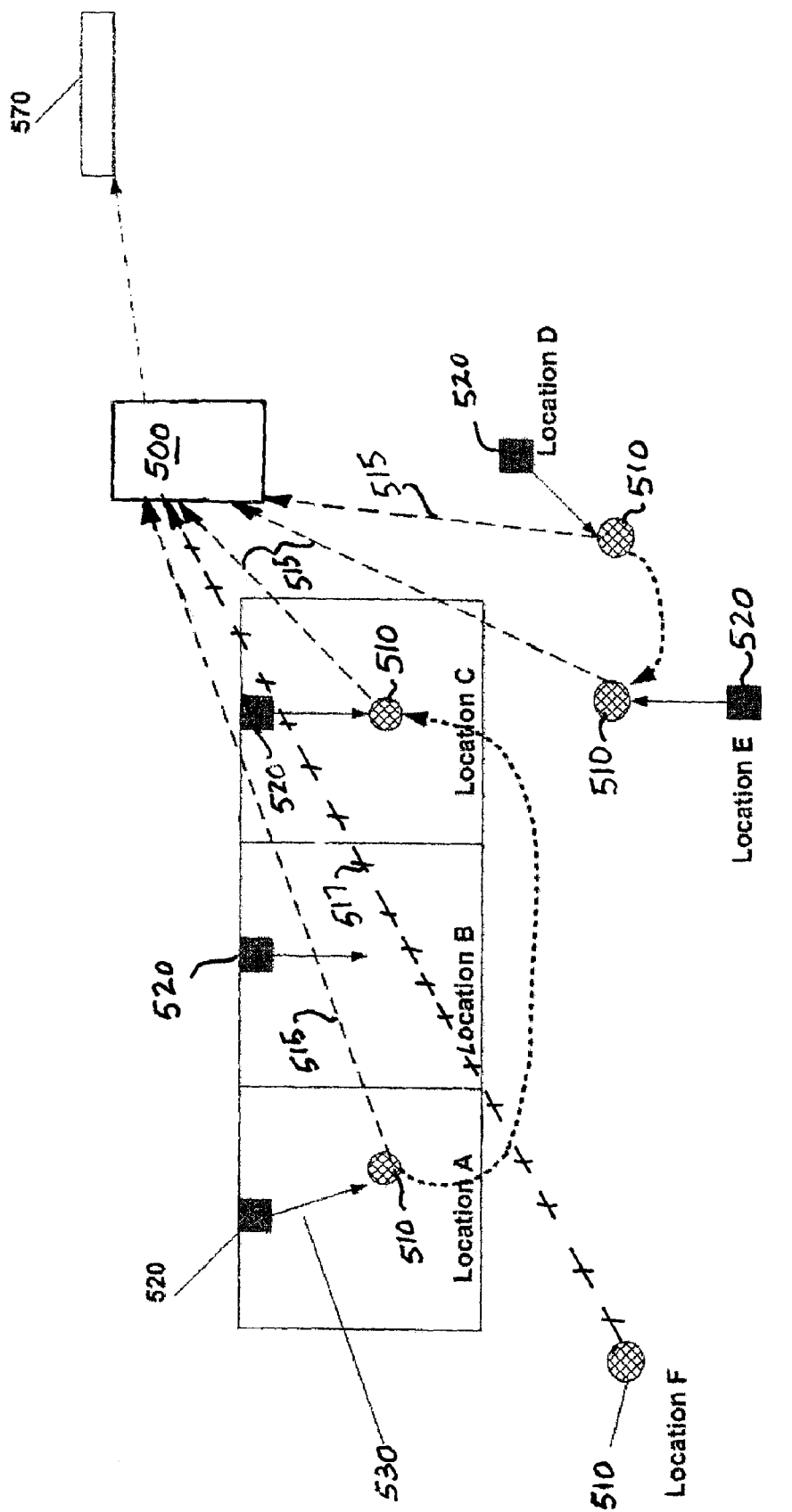

FIG. 10 illustrates the tracking and in-transit visibility features of the invention. Infra-red illuminators 520 are shown located in various rooms (locations A, B, and C) as well as on two sides of a portal (located in any wall of A, B and C, so not specifically shown) in location E and D. The tags 510 are located on or in association with objects or persons illustrated by the cross-hatched circles. The illuminators 520 have adjustable power settings for control of the FOV, and are capable of providing the IR illumination signal throughout the entirety of a room as well as being adjustable to remain within a room or a portion thereof. The FOV of such a device is illustrated as arrow 530. The tags 510 will receive the IR illuminator signals and transmit a data packet 515 via RF to readers 500 located within RF range of the tags. This data packet 515 is not restricted to but will include the illuminator ID (associated with a room location), the Tag ID (associated with an object to which secured or a person's name for instance) and, optionally, certain sensed status data. When a tag relocates, as shown by the dotted line with arrowhead as being moved from location A to location C, the RF signal 515 from the tag provides data about this movement as it has lost sight of the illuminator A and now acquired illuminator C. The location is continuously updated in the LAN or WAN network to which the reader is linked.

In the case of location D and E, as the tag 510 moves from an initial position through the portal, the location and direction of travel is ascertained and recorded at the reader, since it goes from, say illuminator C to illuminator D or E, or D to E. When a tag 510 leaves an area under the influence of any IR illuminator, such as moving to location F, the tag no longer sees an illuminator, and transmits a pre-determined "no illuminator signal" alert 517 (such as "00" signal, shown as a barred line in FIG. 10) to the reader 500. In this manner the "location" is known as not under the influence of any specific infra-red illuminator 520. If the previous record indicated that the tags had passed through a portal, say between location D and E as the last motion, then the general location of the tag is deductively ascertained from the layout of the venue.

The reader 500 is also equipped to communicate on a secondary channel to any existing network 570 such as a hard-wired LAN or WAN, or a wireless 802.11.b/g/f system.

In this manner the location of all tags 510 can be tracked on an existing network-equipped infrastructure.

INDUSTRIAL APPLICABILITY

It is clear that the inventive active, multi-modal, bidirectional RFID tags having bio-metric sensor functionality and the associated illuminator and reader devices have a wide range of applicability to Total Asset Management, In Transit Visibility and Point of Sale operations. As such the inventive tags and system have the clear potential of becoming adopted as the standard in the industry for active RFID tags.

The various embodiments described above are provided by way of illustration only and should not be construed to limit the invention. Thus, the term "optical" includes the visible spectrum, IR, laser and UltraViolet. The beacon function puts the tag into autonomous mode, wherein the illuminator sends an instruction set (a command) to the tag that in the condition when it does not see an illumination signal, it should send out a beacon signal. Typically, the illuminator is "ON" 24/7, i.e., "always ON", as it is permanently powered. Ultrasound has some unique applications as it can range and determine local ambient temperature. Where the reader is bi-modal, e.g., has IR functionality, and is within the FOV of an illuminator, the reader can query the illuminator for diagnostic purposes (operational "health", ID and the like). TAM broadly includes audit, inventory, location, access authorization and tracking of objects and persons. A "signal" broadly includes an instruction set comprising a command or query. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A radio frequency identification and autonomous tracking system comprising:
  a) an active, configurable, multi-mode radio frequency identification tag having an internal microprocessor, a memory structure, and a primary and a secondary communication mode, each of which has at least one of uni-directional or bi-directional sensing and communication capability, said primary communication mode comprising a radio frequency transceiver and said secondary communication mode comprising at least one of an optical transceiver and an ultra-sound transceiver;
  b) at least one reader communicatively coupled with and adapted with a radio frequency receiver to receive signals from the radio frequency identification tag via the radio frequency transceiver of the radio frequency identification tag;
  c) at least one illuminator, positioned within communication range of said tag to sense said illuminator, communicatively coupled with and adapted with an optical transmitter or an ultrasound transmitter to send triggering information signals to the radio frequency identification tag via the secondary mode optical or ultrasound transceiver of the radio frequency identification tag;
  d) said tag microprocessor is configured, upon receipt of, or absence of receipt of, a secondary mode communication signal from said illuminator, for transmission of signals by said tag to said reader via said radio frequency primary communication mode, said tag transmission signals representing information from said tag or said illuminator, data from a sensor, tag identification, identification of an object or person with which said tag is associated, illuminator identification, and combinations thereof; and
  e) wherein said radio frequency identification tag is adapted to transmit to said reader at least one of identification data of an illuminator sensed in its communication range and a signal representative of a condition that no-illuminator-is-sensed when said tag does not receive a signal from at least one of said illuminators in its communication range.

2. A radio frequency identification system as in claim 1 wherein said illuminator includes at least one of an optical receiver and an ultrasound receiver coupled with and adapted to receive information from said radio frequency identification tag via at least one of said optical transceiver and said ultrasound transceiver of said radio frequency identification tag.

3. A radio frequency identification system as in claim 1 wherein in response to said triggering signals from said illuminator, said radio frequency identification tag is adapted to transmit said signals representing information, data from a sensor, tag identification, identification of an object or person with which said tag is associated, illuminator identification, and combinations thereof, to said illuminator via at least one of said primary or said secondary mode of communication of said tag.

4. A radio frequency identification system as in claim 3, wherein said radio frequency identification tag is configured to transmit an additional periodic beacon signal to a reader or an illuminator.

5. A radio frequency identification system as in claim 3 wherein said radio frequency identification tag is adapted to transmit data from said sensor to said reader or said illuminator via said radio frequency transceiver of said tag.

6. A radio frequency identification system as in claim 5 wherein data from said sensor is transmitted by said tag in response to a command triggering signal from said illuminator or said reader.

7. A radio frequency identification system as in claim 5, wherein said sensor is a bio-metric sensor associated with said tag, said tag contains a set of bio-metric data identifying an authorized carrier or user stored in a memory structure of said tag, and said tag is adapted to read bio-metric data from said sensor and compare said read bio-metric data to the bio-metric data in said memory structure, and if there is or is not a match between said read and memory bio-metric data, to send a signal responsive to and representative of said match or not to at least one of said reader and said illuminator.

8. A radio frequency identification system as in claim 1 wherein said reader is linked to a LAN, WAN or wireless network linked to a computer, and said network computer tracks said tag and an object or person associated with said tag by recording a history of tag transmission signals representing illuminators sensed or not sensed.

9. A radio frequency identification system as in claim 1 wherein said tag contains a set of bio-metric data identifying an authorized carrier or user stored in a memory structure of said tag, said system further comprises at least one of an illuminator and a reader having associated therewith a bio-metric sensor for reading bio-metric data from a person and thereafter sending a signal to said tag to transmit said authorized carrier's or user's bio-metric data to said reader or illuminator.

10. A radio frequency identification device for a radio frequency identification and autonomous tracking system having at least one optical or ultrasound transmitting illuminator and at least one reader, each of which has the capability of exchanging signals with said device, said device comprising:
- a) an active, configurable, multi-mode radio frequency identification tag having a microprocessor, a memory structure, and both a primary and a secondary communication mode, each of said communication modes being at least one of a uni-directional and a bi-directional communication mode;
- b) said primary communication mode comprising a radio frequency transceiver in said tag adapted to transmit information to said radio frequency reader of said system;
- c) said secondary communication mode comprising at least one of a receiver and a transceiver in said tag adapted for at least one of optical, ultra-sound, and both optical and ultra-sound signal processing, said secondary communication mode being adapted to receive signals from said at least one optical and ultra-sound illuminator of said system;
- d) said tag microprocessor is configured, upon receipt of, or absence of receipt of, a secondary mode communication signal from said illuminator of said system, for transmission by said tag of signals between said tag and said reader or said illuminator of said system via said primary or secondary communication mode, said signals representing information, data from at least one sensor, tag identification, identification of an object or person with which said tag is associated, illuminator identification, receipt of or absence of receipt of a secondary mode communication signal from said illuminator of said system, and combinations thereof; and
- e) wherein said tag sensor includes a sensor capable of reading bio-metric data and said tag is adapted to transmit said bio-metric data read by said sensor to said reader or said illuminator via said secondary mode of communication.

11. A radio frequency identification tag as in claim 10 wherein said tag contains a set of bio-metric data identifying an authorized carrier or user stored in a memory structure of said tag, and said tag is adapted to compare said read bio-metric data to said bio-metric data in said memory structure, and if there is or is not a match between said read and memory bio-metric data, to send a signal responsive to and representative of said match or not, to at least one of said reader or said illuminator.

12. A radio frequency identification tag as in claim 10 wherein said tag contains a set of bio-metric data identifying an authorized carrier or user stored in a memory structure of said tag and said tag is adapted to transmit said authorized carrier's or user's bio-metric data upon command from said reader or said illuminator of said system.

13. A method of communicating with a radio frequency identification tag in a radio frequency identification and tracking system comprising a plurality of tags, and a plurality of devices separate from said tags, each of said devices having at least one illuminator functionality selected from radio frequency, ultra-sound and optical signal transmission, said illuminator devices being distributed in an array throughout a pre-selected area, each tag being positioned within communication range of at least one of said devices the method comprising the steps of:
- a) providing among said tracking system tags, at least one active, configurable, multi-modal radio frequency tag having a microprocessor, a memory structure, a primary, radio frequency, mode of communication and at least one secondary, optical or ultra-sound, mode of communication;
- b) illuminating an area within communication range of said tag with a secondary, optical or ultra-sound, mode of communication signal from at least one said device having said illuminator functionality;
- c) linking, in said tag, the transmission by said tag of a selected first signal by means of at least one of said tag's primary, radio frequency, and said secondary, optical or ultra-sound, modes of communication, to receipt, or not, by said tag of a secondary mode of communication signal from at least one of said devices;
- d) transmitting by said tag a primary, radio frequency, or secondary, optical or ultra-sound, mode of communication selected second signal to at least one reader, or said device having illuminator functionality within said communication range of said tag;
- e) receiving by said reader said first or said second selected signal transmitted from said radio frequency identification tag, so that said tracking system can determine information relating to the location of said tag;
- f) wherein said selected first or second signal from said tag comprises at least one signal representing said location information, data from a sensor, tag identification, identification of an object or person with which said tag is associated, illuminator device identification, and combinations thereof; and
- g) tracking the location of said tag and an object or person associated with said tag, by comparison of an identification signal from at least one of said devices, or absence of receipt of an identification signal from at least one of said devices by said tag, as reported by said tag to said at least one reader, with information on the physical location of said devices of said array.

14. A method as in claim 13 which includes the added steps of:
- h) loading at least one bio-metric feature set to identify at least one user of said tag in said memory structure of said tag, said feature set comprising a bio-metric signature;
- i) scanning bio-metric data from said user adjacent a point of authorization of said user;
- j) comparing said at least one bio-metric signature feature set with said scanned user bio-metric data to confirm whether or not there is a match of said scanned user bio-metric data to said bio-metric signature; and
- k) authorizing said user or not based on whether or not there is a confirmation of said match.

15. A method as in claim 14 wherein at least one said bio-metric feature set signature is transmitted to said tag by at least one of said primary or secondary modes of communication, and said tag confirms match, or not, upon bio-metric data of said user being scanned adjacent said point of authorization.

16. A method as in claim 14 wherein said tag includes a bio-metric sensor, and said step of scanning of bio-metric data from said user is done by said tag bio-metric sensor.

17. A method as in claim 13 which includes the step of evaluating the radio frequency signal strength of said tag received by said reader to determine the approximate location of said object or person associated with said tag.

* * * * *